(12) United States Patent
Uchida et al.

(10) Patent No.: US 6,316,139 B1
(45) Date of Patent: Nov. 13, 2001

(54) FUEL CELL HAVING A GASKET WITH AN ADHESIVE LAYER

(75) Inventors: Makoto Uchida, Hirakata; Yuko Fukuoka, Kyoto; Yasushi Sugawara, Neyagawa; Hideo Ohara, Kadoma; Nobuo Eda, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/238,740

(22) Filed: Jan. 28, 1999

(30) Foreign Application Priority Data

Feb. 3, 1998 (JP) .................................................. 10-021801

(51) Int. Cl.$^7$ ..................................................... H01M 8/02
(52) U.S. Cl. ............................................................. 429/36
(58) Field of Search ................................... 429/34, 35, 36

(56) References Cited

U.S. PATENT DOCUMENTS

| 4,826,741 | 5/1989 | Aldhart et al. . |
| 5,206,293 | * 4/1993 | Sakai et al. . |
| 5,284,718 | * 2/1994 | Chow et al. . |
| 5,942,091 | * 11/1997 | Romine . |

FOREIGN PATENT DOCUMENTS

| 2719946 | 11/1995 | (FR) . |
| 09-097619-A | * 4/1997 | (JP) . |

OTHER PUBLICATIONS

3 M Laminating Adhesives/Data Page, Jul. 12, 1993.*
Journal of Power Sources, Supramaniam Srinivasan, et al., "Recent Advances in Solid Polymer Electrolyte Fuel Cell Technology with Low Platinum Loading Electrodes", 1990, pp. 367–387 (No month availabe).

Patent Abstracts of Japan, vol. 97, No. 8, Aug. 29, 1997, & JP 09–097619A (Matsushita Electric Industrial Co., Ltd.), Apr. 8, 1997, & Database WPI, Derwent Publications Ltd., London, GB; AN 97–269382, XP002104996.

Patent Abstracts of Japan, vol. 96, No. 3, Mar. 29, 1996, & JP 07–312223A (Matsushita Electric Ind. Co, Ltd.), Nov. 28, 1995, & Database WPI, Derwent Publications Ltd., London, GB; AN 96–47431, XP0002104936, & Chemical Abstracts, vol. 124, No. 22, May 27, 1996, Columbus, Ohio, US; abstract No. 294492, XP002104935.

Chemical Abstracts, vol. 128, No. 18, May 4, 1998, Columbus, Ohio, US; abstract No. 219471, Kurita, Takeshi, et al.: "Assembled Structure of Thin Fuel Cells with Good Gas–Shielding Properties," XP002104994, & JP 10–055813A (Aisin Seiki Co., Ltd., Japan), & Patent Abstracts of Japan, vol. 98, No. 6, April 30, 1998, & JP 10–055813A (Aisin Seiki Co., Ltd., Japan), Feb. 24, 1998, & Database WPI, Derwent Publications Ltd., London, GB; AN 98–203398, XP002104995.

(List continued on next page.)

*Primary Examiner*—Stephen Kalafut
*Assistant Examiner*—Susy Tsang
(74) *Attorney, Agent, or Firm*—Stevens, Davis, Miller & Mosher, LLP

(57) ABSTRACT

A polymer electrolyte fuel cell having a large economical advantage uses a gasket which includes an elastomer layer that is inexpensive, highly resistant to chemicals, particularly to acids, and exhibits a high sealability. The elastomer layer is provided with an adhesive layer, and the gasket is both easy to position and easy to assemble. The fuel cell includes unit cells each including a positive electrode, an electrolyte plate, and a negative electrode, and gaskets each arranged at the circumferential part of the unit cell alternately stacked via a separator placed therebetween. The gasket includes an elastomer layer and an adhesive layer, with the elastomer layer being adhered to at least one side of the separator via the adhesive layer.

6 Claims, 4 Drawing Sheets

OTHER PUBLICATIONS

Patent Abstracts of Japan, vol. 18, No. 355 (E–1573), Jul. 5, 1994, & JP 06–096783A (Matsushita Electric Ind. Co. Ltd.), Apr. 8, 1994, & Chemical Abstracts, vol. 121, No. 4, Jul. 25, 1994, Columbus, Ohio, US; abstract No. 39212, XP002104934.

Patent Abstracts of Japan, vol. 9, No. 251 (E–348), Oct. 8, 1995, & JP 60–101874A (Fuji Denki Sougou Kenkyusho:KK), Jun. 5, 1985.

Patent Abstracts of Japan, vol. 8, No. 135 (E–252), Jun. 22, 1984, & JP 59–046767A (Tokyo Shibaura Denki KK), Mar. 16, 1984.

Patent Abstracts of Japan, vol. 17, No. 450 (E–1416), Aug. 18, 1993, & JP 05–101837A (Mitsubishi Heavy Ind., Ltd.), Apr. 23, 1993.

Patent Abstracts of Japan, vol. 7, No. 222 (E–201), Oct. 4, 1983, & JP 58–112269A (Tokyo Shibaura Denki KK), Jul. 4, 1983.

* cited by examiner

FUEL CELL HAVING A GASKET WITH AN ADHESIVE LAYER

BACKGROUND OF THE INVENTION

1. Field of the Invention

The present invention relates to a fuel cell which uses as a fuel such a reducing agent as pure hydrogen or reform hydrogen obtained from methanol or a fossil fuel and uses air, oxygen or the like as an oxidizing agent. In more particular, it relates to a gasket used for a polymer electrolyte fuel cell.

2. Description of Related Art

It is known that in a polymer electrolyte fuel cell, in cases where for example the cell uses a cation exchange membrane, which is a proton conductor, as the polymer electrolyte and hydrogen and oxygen are introduced thereinto respectively as the fuel and the oxidizing agent, reactions represented by the following formulas (1) and (2) take place.

$$H_2 \rightarrow 2H^+ + 2e^- \quad (1)$$

$$1/2 O_2 + 2H^+ + 2e^- \rightarrow H_2O \quad (2)$$

In the negative electrode, hydrogen dissociates into protons and electrons. The proton moves through the cation exchange membrane toward the positive electrode. The electron moves through electroconductive separator plates, cells stacked therewith in series and further an external circuit and reaches the positive electrode, whereby electricity is generated. In the positive electrode, on the other hand, proton which have moved and reached through the cation exchange membrane, electrons which have moved and reached through the external circuit and oxygen introduced from outside react with one another to form water. Since the reaction is accompanied by heat generation, electricity, water and heat are generated from hydrogen and oxygen, as a whole.

A polymer electrolyte fuel cell differs greatly from other fuel cells in that its electrolyte is composed of an ion exchange membrane, which is a solid polymer. The ion exchange membrane used includes, for example, a perfluorocarbonsulfonic acid membrane (such as that sold under the trade name NAFION, mfd. by Du Pont de Nemours, E. I. Co., USA). In order to show a sufficient proton conductivity, the membrane needs to be in a sufficiently hydrated condition. The hydration of the ion exchange membrane may be effected, as described for example in J. Electrochem. Soc., 135 (1988), p. 2209, by passing the reaction gas through a humidifier to introduce water vapor into the cell and thereby to prevent the drying of the ion exchange membrane. Sealing of each cell may be effected, as described for example in J. Power Sources, 29 (1990), p. 367, by a method wherein the area of the ion exchange membrane is made larger than the electrode area and the circumferential part of the ion exchange membrane which is not bonded to the electrode is held by the upper and the lower gaskets between them.

The materials generally used for the gasket include glass fiber fabric coated with polytetrafluoro-ethylene (such as that sold trade name TEFLON, mfd. by Du Pont de Nemours, E. I. Co., USA) and fluororubber. U.S. Pat. No. 4,826,741 discloses the use of silicone rubber and fluororubber.

FIG. 2 shows an exterior view of a common stack-type polymer electrolyte fuel cell. Separator plates 2 formed of a conductive material, such as glassy carbon, and internal cells (not shown in the Figure) whose circumferential parts are held between insulating gaskets 1 are stacked alternately. A copper-made current collecting plate 3 is closely affixed to the outermost separator plate to form a stack as a whole. The stack is put between stainless steel end plates 5 via insulating plates 4 and the two end plates are bound fast with bolts and nuts. In the Figure, numeral 6 indicates a hydrogen inlet, 7 a hydrogen outlet, 8 an oxygen inlet, 9 an oxygen outlet and 10 a water discharge drain.

FIG. 3 shows a sectional view of an internal cell of a common stack-type cell. Electrodes 12 are bonded to both sides of an ion exchange membrane 11 of the center to form an assembly. Grooved separator plates 2 are positioned at the upper and lower sides of the assembly. The ion exchange membrane 11 has a larger area than the electrode 12, and the circumferential part of the membrane is held by gaskets 1 between them to seal each cell and insulate the separator plates from each other. When, as shown in the Figure, a gas path 13 is provided inside the stack according to necessity (that is, in the case of internal manifold type), the gasket serves also to seal the gas path. The separator plate 2 provided with grooves may have various structures; for example, a porous grooved plate is fixed into the groove, or a wire mesh is used in the groove.

BRIEF SUMMARY OF THE INVENTION

However, the above-mentioned prior methods have various problems. When the respective cells are stacked, in the operation of placing the gasket accurately on the separator plate and holding the assembly of the ion exchange membrane 11 and the electrode 12 by the gaskets between them, the gasket, which is soft and in the form of sheet, can be difficulty to position and hence gives a poor operation efficiency, or it is apt to a give rise to defective seal due to mispositioning.

Further, when a high pressure gas is used, the gasket tends to get away to the outside of the stack.

To solve the above-mentioned problems, the gasket used in the present invention is given a structure comprising an elastomer layer which is inexpensive and highly resistant to chemicals, particularly to acids, and exhibits a high sealability and an adhesive layer. By virtue of the structure, a polymer electrolyte fuel cell having a large economical advantage which uses the gasket that is easy to position and easy to assemble is provided.

Thus, the fuel cell of the present invention is a fuel cell which comprises unit cells each comprising a solid polymer ion exchange membrane and a positive and a negative electrodes formed on the both sides of the membrane and gaskets each arranged at the circumferential part of the unit cell alternately stacked with each other via a separator placed therebetween, wherein the gasket comprises an elastomer layer and an adhesive layer, said elastomer layer being adhered to at least one side of the separator via said adhesive layer. Accordingly, at the time of assembling a cell stack, since the gasket can be adhered to the separator, mispositioning of the gasket is prevented from occurring.

DETAILED DESCRIPTION OF THE INVENTION

Figure 1A:
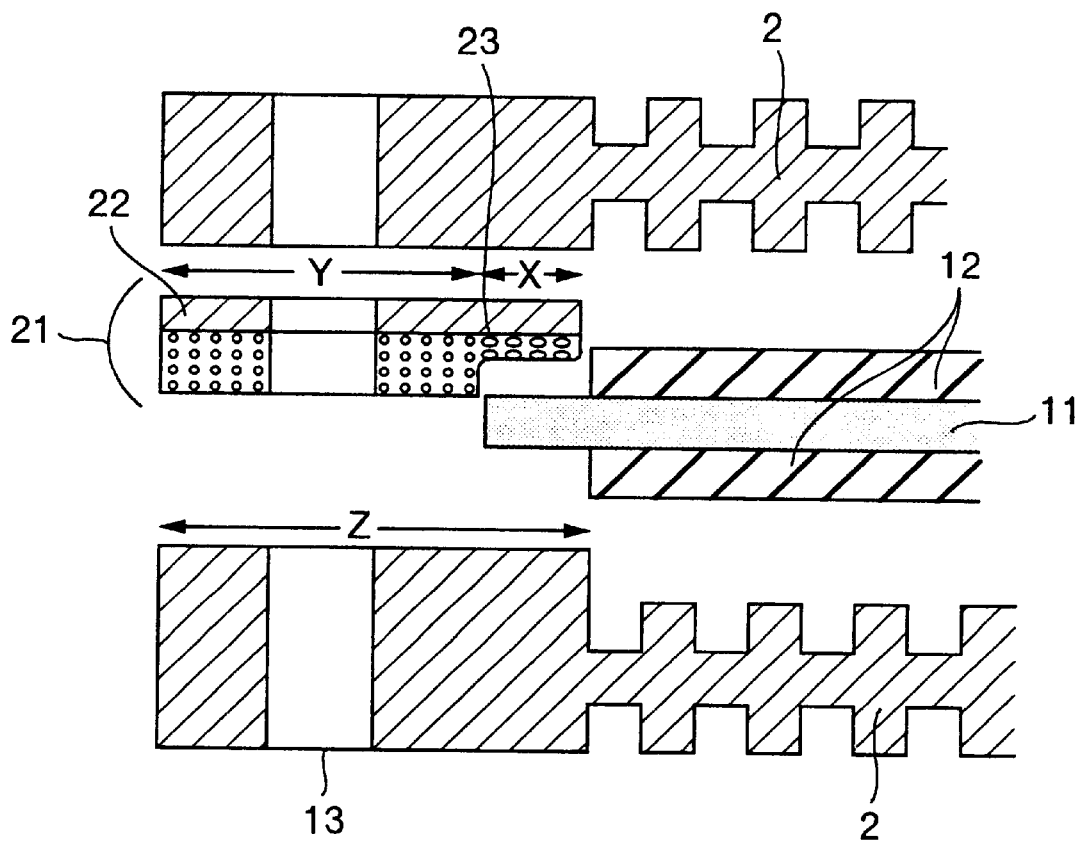
FIG. 1A is a sectional view of a cell in one embodiment of the present invention.
Figure 1B:
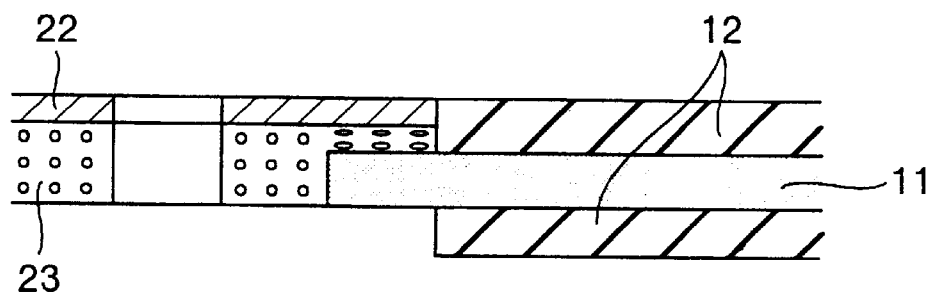
FIG. 1B is a sectional view of a cell in one embodiment of the present invention.
Figure 1C:
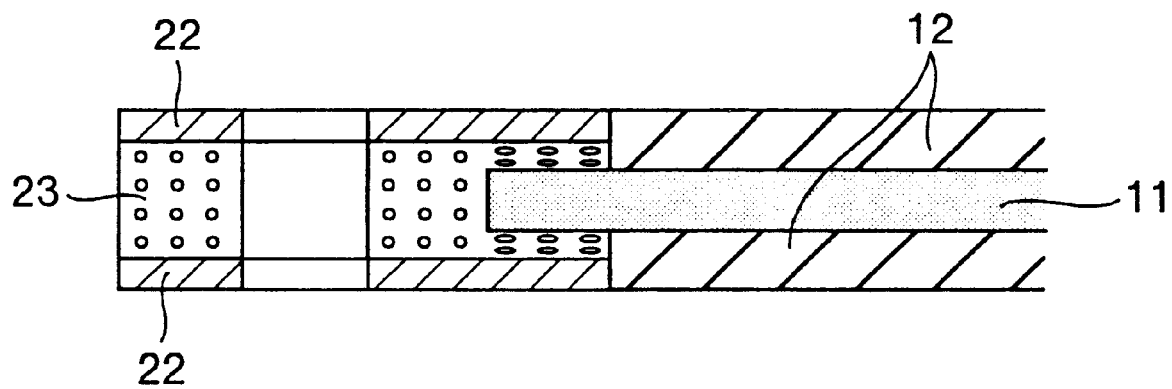
FIG. 1C is a sectional view of a cell in one embodiment of the present invention.
Figure 1D:
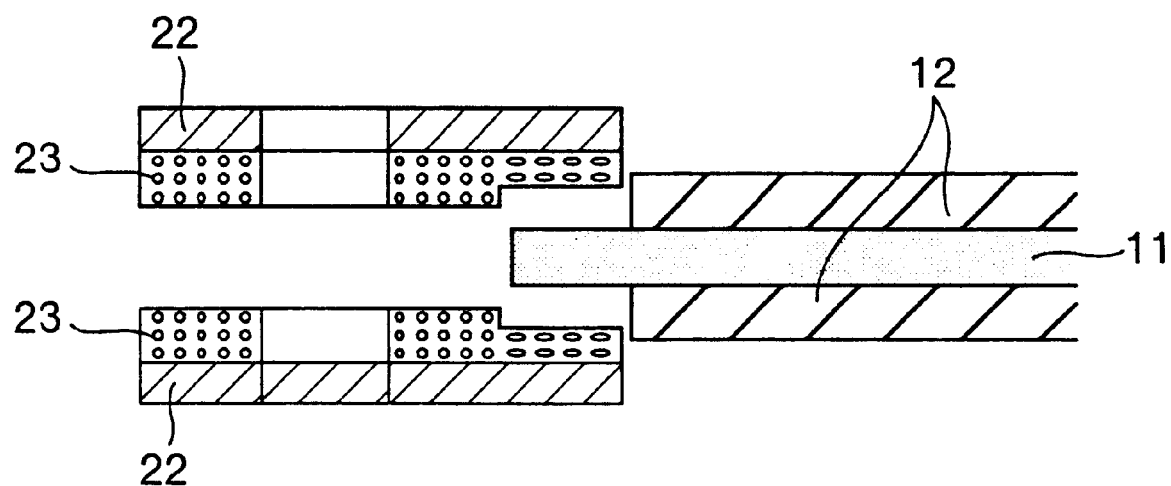
FIG. 1D is a sectional view of a cell in one embodiment of the present invention.
Figure 2:
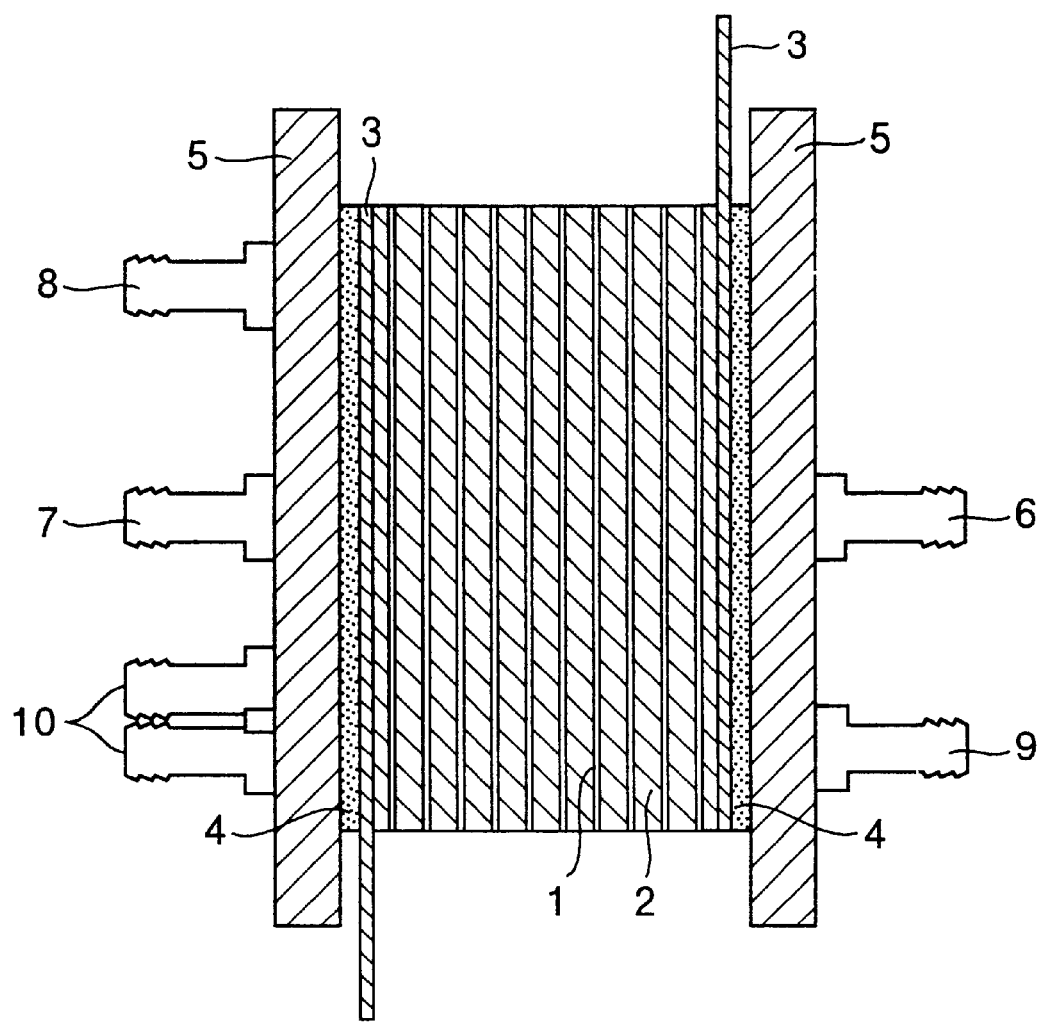
FIG. 2 is an exterior view of a polymer electrolyte fuel cell of the prior art.
Figure 3:
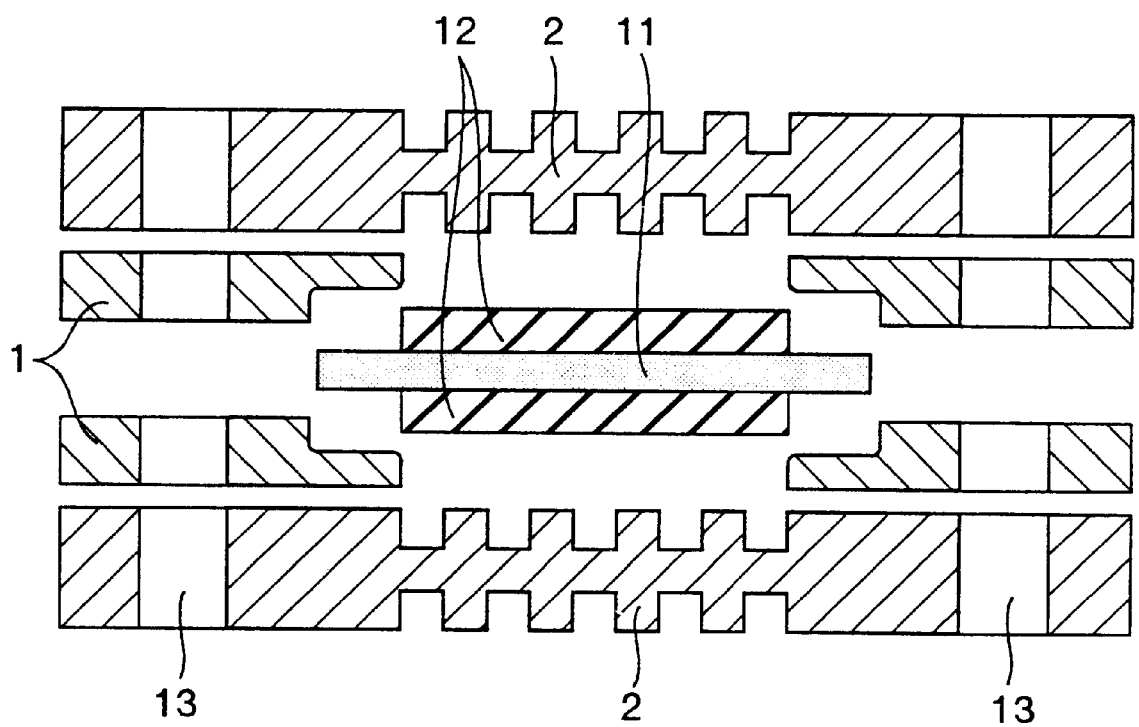
FIG. 3 is a sectional view of a prior cell.

According to the present invention, there is provided a fuel cell which comprises unit cells each comprising a solid polymer ion exchange membrane and a positive and a negative electrodes formed on the both sides of the membrane and gaskets each arranged at the circumferential part of the unit cell alternately stacked with each other via a separator placed therebetween, wherein the gasket comprises an elastomer layer and an adhesive layer, said elastomer layer being adhered to one side of at least one separator via said adhesive layer.

The ion exchange membrane has a larger surface area than the positive electrode and the negative electrode. Consequently, the unit cell has an exposed ion exchange membrane part.

The gasket has a dimension sufficient to cover at least the exposed part of the ion exchange membrane. It may further has a dimension which allows provision of a gas path.

The gasket comprises an elastomer layer and an adhesive layer.

According to the above-mentioned structure, the gasket can be adhered to the separator at the time of assembling a cell stack, so that mispositioning of the gasket does not occur and the assembling operation can proceed quickly. Furthermore, since the elastomer layer is adhered to the separator plate via the adhesive layer, even when a high pressure gas is used, the elastomer layer does not get away to the outside by virtue of the adhesive force between the elastomer layer and the separator plate.

Since the working temperature of a polymer electrolyte fuel cell is not higher than 150° C., the elastomer used therein may be various elastic materials, including fluororubber. However, since an ion exchange membrane has sulfonic acid groups as its exchange group and hence is acidic and moreover water is formed in the cell and the reaction gas is humidified, the elastomer needs to be resistant to acids, water vapor, hot water, or the like. Any desired materials may be adopted so long as the above-mentioned conditions of being resistant to heat, acid, water vapor, hot water or the like are satisfied.

However, fluororubbers are expensive and silicon rubbers, in some cases, gradually undergo scission of the siloxane linkage due to the acidity of the sulfonic acid group of the ion exchange membrane and resultant degradation. Therefore, elastomers preferred for use are olefinic rubbers and blend rubbers comprising olefinic rubbers. The blending ratio is not particularly restricted and may be selected according to necessity. Olefinic elastomers which contain no or substantially no unsaturation bond in the polymer main chain are excellent in chemical resistance, heat resistance and weather resistance as compared with diene rubbers, which have double bonds in the main chain, such as isoprene rubber, butadiene rubber, nitrile rubber and chloroprene rubber. Olefinic elastomers, as compared with fluororubbers and silicone rubbers, are inexpensive and excellent in weather resistance.

Olefinic rubbers preferably used include ethylene-propylene rubber, acryl rubber, butyl rubber and halogenated butyl rubber.

The adhesive used is not particularly restricted but it is preferably acrylic solvent type adhesive, polyisobutylene rubber type adhesive and isobutylene-isoprene rubber type adhesive. The thickness of the elastomer layer and of the adhesive layer need to be sufficient to achieve insulation and sealing between adjacent separators while absorbing the thickness of the ion exchange membrane. The thickness is preferably 10–300 $\mu$m for the adhesive layer and 100–1000 $\mu$m for the elastomer layer. The thickness of the part of the gasket which comes in contact with the ion exchange membrane may be reduced as far as the thickness of the ion exchange membrane as the limit. Similarly, the thickness of the part (Z) of the separator which comes in contact with a laminate of the gasket and the unit cell may be changed as shown in FIG. 1A.

EXAMPLES

The fuel cell of the present invention is explained with reference to Drawings.

FIG. 1(*a*) is a sectional view of a cell of Example 1 of the present invention. In the Figure, the gasket 21 is a product obtained by adhering an elastomer layer 23 of olefinic ethylene-propylene rubber (EPDM) of 0.7 mm thickness to one side of a separator plate via an adhesive layer 22. The gasket 21 of the present invention can achieve both the sealing between separator plates and the sealing between an ion exchange membrane and a separator while, as shown in FIG. 1(*b*), absorbing the thickness of the ion exchange membrane 11 by virtue of the part (X) which comes in contact with the ion exchange membrane 11 being compressed to a greater extent than the part (Y) which is held between two separator plates 2. In the case of a gasket comprising an elastomer layer alone, which is very soft, when the internal pressure of the cell and the gas path becomes high the gasket shifts to the outside and is blown through. In the case of the gasket of the present invention, on the other hand, the elastomer layer is prevented from shifting by the adhesive force of the adhesive layer and the gasket is not blown through. At the time of assembling a cell stack, moreover, since the gasket can be adhered to the separator plate beforehand, mispositioning of the gasket does not occur at the time of assembling and the operation can be proceeded speedily. The gasket is also excellent in heat resistance and acid resistance and is not affected in the long term performance test of the fuel cell.

Though a method of sealing the ion exchange membrane from one direction by using one piece of gasket which has one adhesive layer was shown in FIG. 1(*a*), similar effects can be obtained by using a gasket which has two adhesive layers as shown in FIG. 1(*c*) or by using two pieces of gaskets and holding the ion exchanging membrane between the gaskets as shown in FIG. 1(*d*).

Example 1

A fuel cell was prepared according to the structure of FIG. 1(*a*). The gasket 21 was one obtained by adhering an elastomer layer 23 of olefinic ethylene-propylene rubber (EPDM) of 0.7 mm thickness to one side of a separator plate via an adhesive layer 22. The gasket of the present invention was prevented from shifting of the elastomer layer by the adhesive force of the adhesive layer and was not blown through. At the time of assembling a cell stack, moreover, since the gasket could be adhered to the separator plate beforehand, mispositioning of the gasket did not occur at the time of assembling and the operation could be proceed quickly.

The EPDM used was kept in contact with the ion exchange membrane in a hot water of 80° C. for 3 months to examine the hot water resistance and acid resistance of the elastomer material. The EPDM showed no change and hence showed a high durability. It was also not affected in the 5000 hours long-term performance test of the fuel cell.

Example 2

A fuel cell was prepared according to the same structure as in Example 1 except for changing the elastomer to olefinic butyl rubber (IIR). Similarly to EPDM, the butyl rubber showed no change in the above-mentioned heat resistance and acid resistance tests, and showed no degradation in the long term performance test of the fuel cell.

Example 3

A fuel cell was prepared according to the same structure as in Example 1 except for changing the elastomer to olefinic acryl rubber (ACM). Similarly to EPDM, the acryl rubber showed no change in the above-mentioned heat resistance and acid resistance tests and showed no degradation in the long term performance test of the fuel cell.

Example 4

A fuel cell was prepared according to the same structure as in Example 1 except for changing the elastomer to olefinic halogenated butyl rubber (X-IIR). Similarly to EPDM, the halogenated butyl rubber showed no change in the above-mentioned heat resistance and acid resistance tests and showed no degradation in the long term performance test of the fuel cell.

Referential Example 1

A fuel cell was prepared according to the same structure as in Example 1 except for changing the elastomer to diene-type nitrile rubber (NBR). In the above-mentioned heat resistance and acid resistance tests, the ion exchange membrane discolored and the rubber was found to have lowered its elasticity.

Referential Example 2

A fuel cell was prepared according to the same structure as in Example 1 except for changing the elastomer to diene-type chloroprene rubber (CR). After 46 days in the above-mentioned heat resistance and acid resistance tests, swelling of 160% or more was observed and the rubber was found to have lowered its elasticity.

Referential Example 3

A fuel cell was prepared according to the same structure as in Example 1 except for changing the elastomer to silicone rubber. After 46 days in the above-mentioned heat resistance and acid resistance tests, the part of the rubber which had been in contact with the ion exchange membrane was observed to have degraded and changed into fine powder. In the long term performance test of the fuel cell, the contact part of the silicone gasket with the ion exchange membrane was found to have changed into silica ($SiO_3$)-like fine powder.

Referential Example 4

A fuel cell was prepared according to the same structure as in Example 1 except for changing the elastomer to butadiene-type styrene-butadiene rubber (SBR). After one month in the above-mentioned heat resistance and acid resistance tests the rubber was found to have swollen and degraded.

The structural formulas of the elastomers of Examples and Referential Examples are summarized in Table 1.

TABLE 1

| | Elastomer | | Structural Formula | |
|---|---|---|---|---|
| Example 1 | Ethylene-propylene Rubber | EPM | $-(CH_2-CH_2)-(CH_2-CH(CH_3))-$ | Random Copolymer |
| | | EPDM | $-(CH_2-CH_2)-(CH_2-CH(CH_3))-(\text{ENB ring with }CH-CH_3)-$ | Ditto ENB-Type |
| Example 2 | Butyl Rubber | IIR | $-(CH_2-C(CH_3)_2)-(CH_2-C(CH_3)=CH-CH_2)-$ | Isoprene Content 2 mol % or less |
| Example 3 | Acryl Rubber | ACM | $-(CH_2-CH(O=C-OR))-(CH_2-CH(OCH_2CH_2Cl))-$ | R: Ethyl, Butyl, etc. |
| | | ANM | $-(CH_2-CH(O=C-OR))-(CH_2-CH(CN))-$ | |

TABLE 1-continued

| Elastomer | | | Structural Formula | |
|---|---|---|---|---|
| Referential Example 1 | Nitrile Rubber | NBR | —(CH$_2$—CH=CH—CH$_2$)—(CH$_2$—CH)— <br>                                                             CN | Random Copolymer |
| Referential Example 2 | Chloroprene Rubber | CR |            Cl <br>            \| <br> —(CH$_2$—C=CH—CH$_2$)— | High-trans |
| Referential Example 3 | Silicone Rubber | Q | CH$_3$—Si(CH$_3$)—O—Si(CH=CH$_2$)(CH$_3$)—O | Methylvinylsilicone Rubber (VMQ) |
| | | | CH$_2$CH$_3$CF$_3$—Si—O—Si(CH=CH$_2$)(CH$_3$)—O | Fluorosilocone Rubber |
| Referential Example 4 | Styrene-Butadiene Rubber | SBR | —(CH$_2$—CH=CH—CH$_2$)—(CH$_2$—CH(C$_6$H$_5$))— | Random Copolymer |

Similar effects were obtained also when materials obtained by blending the above-mentioned elastomers with each other or blending the elastomer(s) with other elastomers were used.

As set forth above, according to the present invention, a polymer electrolyte fuel cell having a large economical advantage can be provided which uses a gasket which comprises an elastomer layer that is inexpensive, highly resistant to chemicals, particularly to acids, and exhibits a high sealability and an adhesive layer provided to the elastomer layer and which gasket is easy to position and easy to assemble.

What is claimed is:

1. A fuel cell comprising unit cells each comprising a solid polymer ion exchange membrane, a positive electrode and a negative electrode formed on each side of the membrane, respectively, and gaskets arranged on the exposed ion exchange membrane on the circumferential part of the unit cell alternately stacked with each other via a separator placed therebetween, wherein each of the gaskets comprises
   (a) an elastomer layer comprising a first side and a second side and
   (b) an adhesive layer affixed to said first side of the elastomer layer, said adhesive layer comprising an adhesive selected from the group consisting of polyisobutylene rubber adhesives and isobutylene-isoprene rubber adhesives, and said elastomer layer being adhered to at least one side of the separator via said adhesive layer.

2. The fuel cell according to claim 1, wherein said elastomer consists essentially of olefinic rubber.

3. The fuel cell according to claim 2, wherein said olefinic rubber is at least one member selected from the group consisting of ethylene-propylene rubber, acryl rubber, butyl rubber, and halogenated butyl rubber.

4. The fuel cell according to claim 1, further comprising a second adhesive layer affixed to said second side of the elastomer layer.

5. The fuel cell according to claim 1, wherein said elastomer layer has a thickness of from 100 to 1000 µm.

6. The fuel cell according to claim 1, wherein said adhesive layer has a thickness of from 10 to 300 µm.

* * * * *